(12) United States Patent
Forrest et al.

(10) Patent No.: US 6,637,229 B1
(45) Date of Patent: Oct. 28, 2003

(54) COOLING FAN CONTROL METHOD FOR MINIMIZING THE POWER CONSUMPTION OF A VEHICLE AIR CONDITIONING SYSTEM

(75) Inventors: Wayne Oliver Forrest, Gasport, NY (US); Lawrence Scherer, North Tonawanda, NY (US); Nicholas Joseph Alonge, Jr., Tonawanda, NY (US); Frank A. Krueger, Lockport, NY (US); Lindsey Lee Leitzel, Lockport, NY (US); Paul J. Bruski, Buffalo, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/274,620

(22) Filed: Oct. 21, 2002

(51) Int. Cl.[7] ............................. F25B 1/00; F25B 27/00
(52) U.S. Cl. ......................... 62/230; 62/323.3; 62/183
(58) Field of Search ................................ 62/230, 323.3, 62/181, 183, 243

(56) References Cited

U.S. PATENT DOCUMENTS 4,327,559 A * 5/1982 Spethman .................... 62/179
5,735,134 A * 4/1998 Liu et al. ..................... 62/230
6,257,007 B1 * 7/2001 Hartman ...................... 62/183
6,367,270 B2 * 4/2002 Niimi et al. .................. 62/133

* cited by examiner

Primary Examiner—Marc Norman
(74) Attorney, Agent, or Firm—Patrick M. Griffin

(57) ABSTRACT

An improved control method for a vehicle air conditioning system including a refrigerant compressor and a condenser cooling fan adjusts the power consumption of the condenser cooling fan in a manner to minimize the combined power consumption of compressor and the condenser cooling fan while maintaining adequate cooling of the condensed refrigerant. When the air conditioning system is operating at less than full capacity, the combined power consumption of the compressor and the condenser cooling fan is determined for each of a series of operating intervals. The change in the combined power consumption from one operating interval to the next is computed to determine the effect of a prior cooling fan power adjustment, and the power level of the cooling fan is incrementally adjusted in the same direction as the prior adjustment so long as the prior adjustment resulted in at least a specified reduction of the combined power consumption. Otherwise, the power level of the cooling fan is incrementally adjusted in the opposite direction so that the control continually seeks the cooling fan power level that will minimize the combined power consumption of the compressor and condenser cooling fan.

11 Claims, 2 Drawing Sheets

COOLING FAN CONTROL METHOD FOR MINIMIZING THE POWER CONSUMPTION OF A VEHICLE AIR CONDITIONING SYSTEM

TECHNICAL FIELD

This invention relates to a vehicle air conditioning system including a refrigerant compressor and an electrically driven cooling fan, and more particularly to a control for adjusting the operation of the cooling fan so as to minimize the power consumption of the air conditioning system while maintaining adequate refrigerant cooling.

BACKGROUND OF THE INVENTION

Most vehicle air conditioning systems include a refrigerant compressor that is mechanically driven by the vehicle engine through a selectively engageable clutch, and at least one electrically driven cooling fan that is selectively activated to provide supplemental air flow through a condenser for cooling and condensing compressed refrigerant. As with the compressor, the cooling fan behaves as an engine accessory load since the electrical energy for operating the cooling fan is ultimately generated by an engine-driven alternator or generator to prevent discharging of the vehicle storage battery. Thus, the power requirements of the compressor and the cooling fan both influence the engine fuel economy.

The primary purpose of the cooling fan is to move air through the condenser to augment removal of heat from the circulating refrigerant. However, increasing the flow of air through the condenser allows the same cooling performance to be achieved with a lower compressor capacity. In other words, there is a trade-off between the work performed by the cooling fan and the work performed by the compressor. However, in most cases, the trade-off is ignored and the cooling fan is activated either continuously or at a high duty cycle to ensure that there is always sufficient cooling of the refrigerant. While such a control philosophy is simple to implement, it fails to minimize the power consumption of the system and the associated accessory loading, which in turn, unnecessarily reduces the engine fuel economy. Accordingly, what is desired is a control that is also simple to implement, but that minimizes the system power consumption to improve engine fuel economy while maintaining adequate cooling of the condensed refrigerant.

SUMMARY OF THE INVENTION

The present invention is directed to an improved control method for a vehicle air conditioning system including a refrigerant compressor and a condenser cooling fan, wherein the power consumption of the condenser cooling fan is adjusted in a manner to minimize the combined power consumption of compressor and the condenser cooling fan while maintaining adequate cooling of the condensed refrigerant. When the air conditioning system is operating at less than full capacity, the combined power consumption of the compressor and the condenser cooling fan is determined for each of a series of operating intervals. The change in the combined power consumption from one operating interval to the next is computed to determine the effect of a prior cooling fan power adjustment, and the power level of the cooling fan is incrementally adjusted in the same direction as the prior adjustment so long as the prior adjustment resulted in at least a specified reduction of the combined power consumption. If the prior adjustment failed to produce the specified reduction in overall power consumption, the power level of the cooling fan is incrementally adjusted in the opposite direction so that the control continually seeks the cooling fan power level that will minimize the combined power consumption of the compressor and condenser cooling fan.

DESCRIPTION OF THE PREFERRED EMBODIMENT

Figure 1:
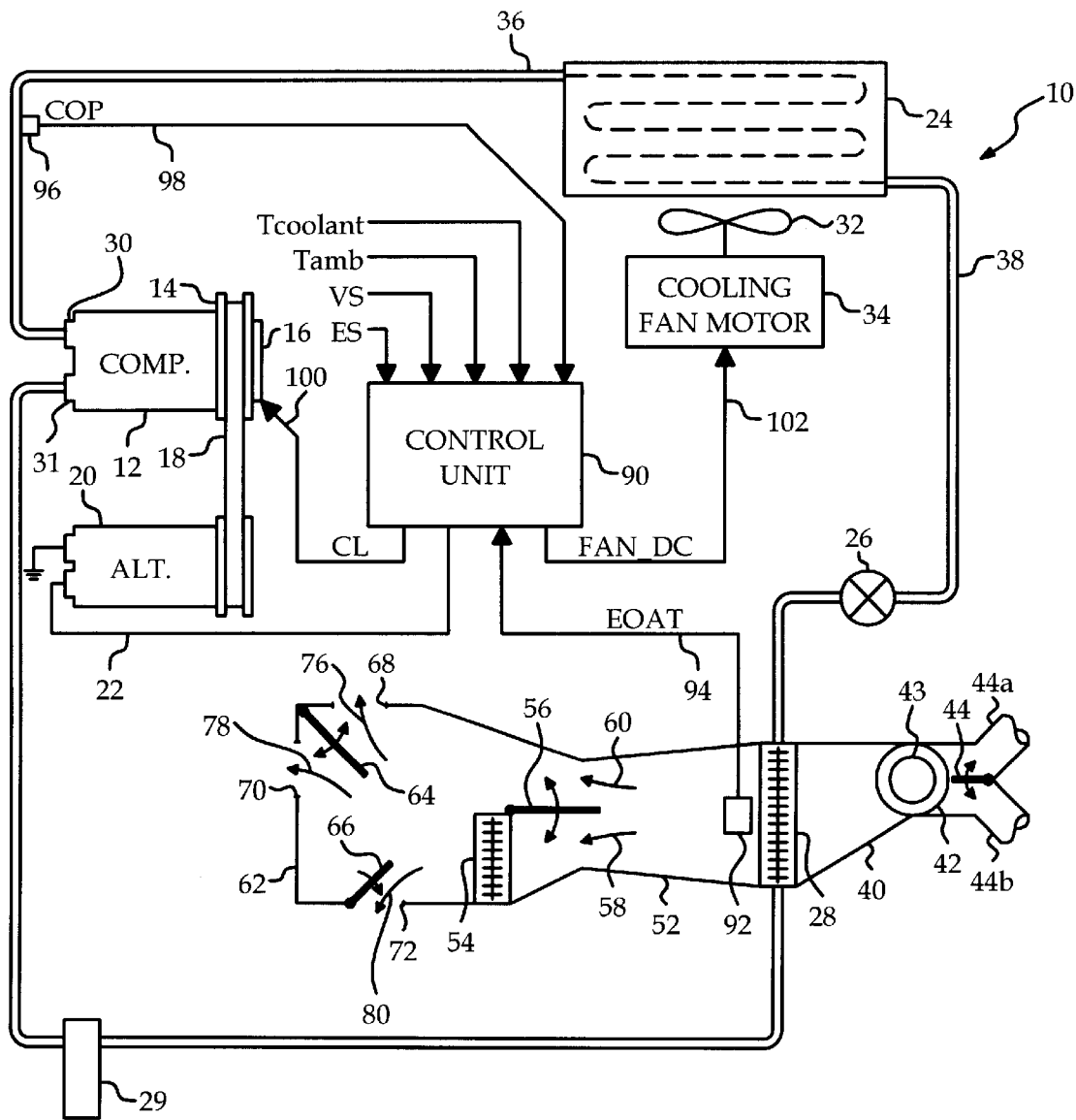
FIG. 1 is a block diagram of a vehicle air conditioning system according to this invention, including a microprocessor-based control unit, an engine driven refrigerant compressor and an electric motor driven cooling fan.

Referring to FIG. 1, the reference numeral 10 generally designates a vehicle air conditioning system, including a refrigerant compressor 12 coupled to a drive pulley 14 via an electrically activated clutch 16. In the illustrated embodiment, the compressor 12 has a fixed displacement, and the clutch 16 is cycled on and off to limit the compressor capacity; however, the invention is also applicable to a compressor in which the working displacement is varied to control capacity. The compressor drive pulley 14 is coupled to a rotary shaft of the vehicle engine (not shown) via drive belt 18, and the clutch 16 is selectively engaged or disengaged to turn the compressor 12 on or off, respectively. The drive belt 18 is also configured to rotatably drive an alternator 20, which develops a regulated output voltage on line 22 for charging a vehicle storage battery (not shown) and supplying power to the system 10 and other vehicle electrical loads.

In addition to the compressor 12, the system 10 includes a condenser 24, an orifice tube 26, an evaporator 28, and an accumulator/dehydrator 29 arranged in order between the compressor discharge port 30 and suction port 31. A cooling fan 32, operated by an electric drive motor 34, is controlled to provide supplemental air flow through the condenser 24 for cooling and condensing the compressed refrigerant. The orifice tube 26 allows the cooled high pressure refrigerant in line 38 to expand in an isenthalpic process before passing through the evaporator 28. The accumulator/dehydrator 29 separates low pressure gaseous and liquid refrigerant, directs a gaseous portion to the compressor suction port 31, and acts as a reservoir for the reserve refrigerant charge. In an alternative system configuration, the orifice tube 26 is replaced with a thermostatic expansion valve (TXV); in this case, the accumulator/dehydrator 29 is omitted, and a receiver/drier (R/D) is inserted in line 38 upstream of the TXV to ensure that liquid refrigerant is supplied to the inlet of the TXV.

The evaporator 28 is formed as an array of finned refrigerant conducting tubes, and an air intake duct 40 disposed on one side of evaporator 28 houses an inlet air blower 42 driven by an electric blower motor 43 to force air past the evaporator tubes. The duct 40 is bifurcated upstream of the blower 42, and an inlet air control door 44 is adjustable as shown to control inlet air mixing; depending on the door position, outside air may enter blower 42 through duct leg 44a, and passenger compartment air may enter blower 42 through duct leg 44b. An air outlet duct 52 disposed on the downstream side of blower 42 and evaporator 28 houses a heater core 54 formed as an array of finned tubes that conduct engine coolant. The outlet duct 52 is bifurcated with the heater core 54 disposed in one air stream of duct 52. A temperature control door 56 is adjustable as shown to control what proportion of air must pass through the heater core 54. Air passing through heater core 54 is indicated by the arrow 58, while air by-passing the heater core 54 is indicated by the arrow 60. The heated and un-heated air portions are mixed in a plenum portion 62 of outlet duct 52 downstream of temperature control door 56, and a pair of mode control doors 64, 66 direct the mixed air through one or more outlets, including a defrost outlet 68, a panel outlet 70, and a heater outlet 72. The mode control doors 64 and 66 are adjustable as shown to switch the outlet air between various combinations of defrost outlet 68, panel outlets 70 and heater outlet 72, as indicated by arrows 76, 78 and 80, respectively.

The system 10 is controlled by the microprocessor-based control unit 90 based on various inputs, including the ambient air temperature Tamb, the vehicle speed VS, the engine speed ES, the evaporator outlet air temperature EOAT, the compressor outlet pressure COP and the engine coolant temperature Tcoolant. Other typical inputs include the passenger compartment air temperature and the usual operator demand inputs, such as the desired cabin temperature, and override controls for blower speed and air discharge mode. The evaporator outlet air temperature EOAT is developed by the temperature sensor 92, and appears on line 94; the compressor outlet pressure COP is developed by the pressure sensor 96, and appears on line 98. In response to these inputs, the control unit 90 develops output signals for controlling the compressor clutch 16, the condenser cooling fan motor 34, the inlet air blower motor 43, and the air control doors 44, 56, 64 and 66. In FIG. 1, the output signal CL for the clutch 16 appears on line 100 and the output signal FAN_DC for condenser cooling fan motor 34 appears on line 102. For simplicity, output signals and actuators for the blower motor 43 and the air control doors 44, 56, 64, 66 have been omitted from FIG. 1. Electrical power for operating the control unit 90, clutch 16, the cooling fan motor 34 and the various actuators of the system 10 is obtained from output line 22 of alternator 20, as mentioned above.

According to the present invention, the control unit 90 regulates the power consumption of cooling fan motor 34 in a manner to minimize the combined power consumption of compressor 12 and cooling fan motor 34 while maintaining adequate cooling of the condensed refrigerant. When the system 10 is operating at less than full capacity, the combined power consumption of the compressor 12 and the cooling fan motor 34 is determined for each of a series of on/off cycles of compressor 12. The change in the combined power consumption from one cycle to the next is computed to determine the effect of a prior cooling fan power adjustment, and the power level of the cooling fan motor 34 is incrementally adjusted in the same direction as the prior adjustment so long as the prior adjustment resulted in at least a specified reduction of the combined power consumption. If the prior adjustment failed to produce the specified reduction in overall power consumption, the power level of the cooling fan motor 34 is incrementally adjusted in the opposite direction so that the control unit 90 continually seeks the cooling fan power level that will minimize the combined power consumption of compressor 12 and cooling fan motor 34. This method is illustrated by the decision matrix of FIG. 2, described below.

In the illustrated embodiment, the power consumption of compressor 12 is mathematical modeled based on the compressor speed CS and various measured refrigerant parameters. The compressor speed CS may be determined based on the product of engine speed ES and a pulley ratio afforded by relative size of the engine and compressor drive pulleys, and the measured parameters may be high-side refrigerant pressure Phs and low-side refrigerant pressure Pls. For example, the current compressor power CURR_PWR may be modeled as:

$$CURR\_PWR=(K1*CS)*[K2+K3\ (Phs-Pls)\ (K4)]$$

where K1, K2 and K3 are calibration values, and K4 is a linearizing factor. In a mechanization of this model, the compressor outlet pressure COP can be used as Phs, and the evaporator outlet air temperature can be used to determine Pls. The power consumption of the cooling fan motor 34 is determined based on the motor activation level (where the motor power level is controlled by modulating its activation level or duty cycle) and the energy conversion efficiency of the alternator 20.

Figures 2, 3:
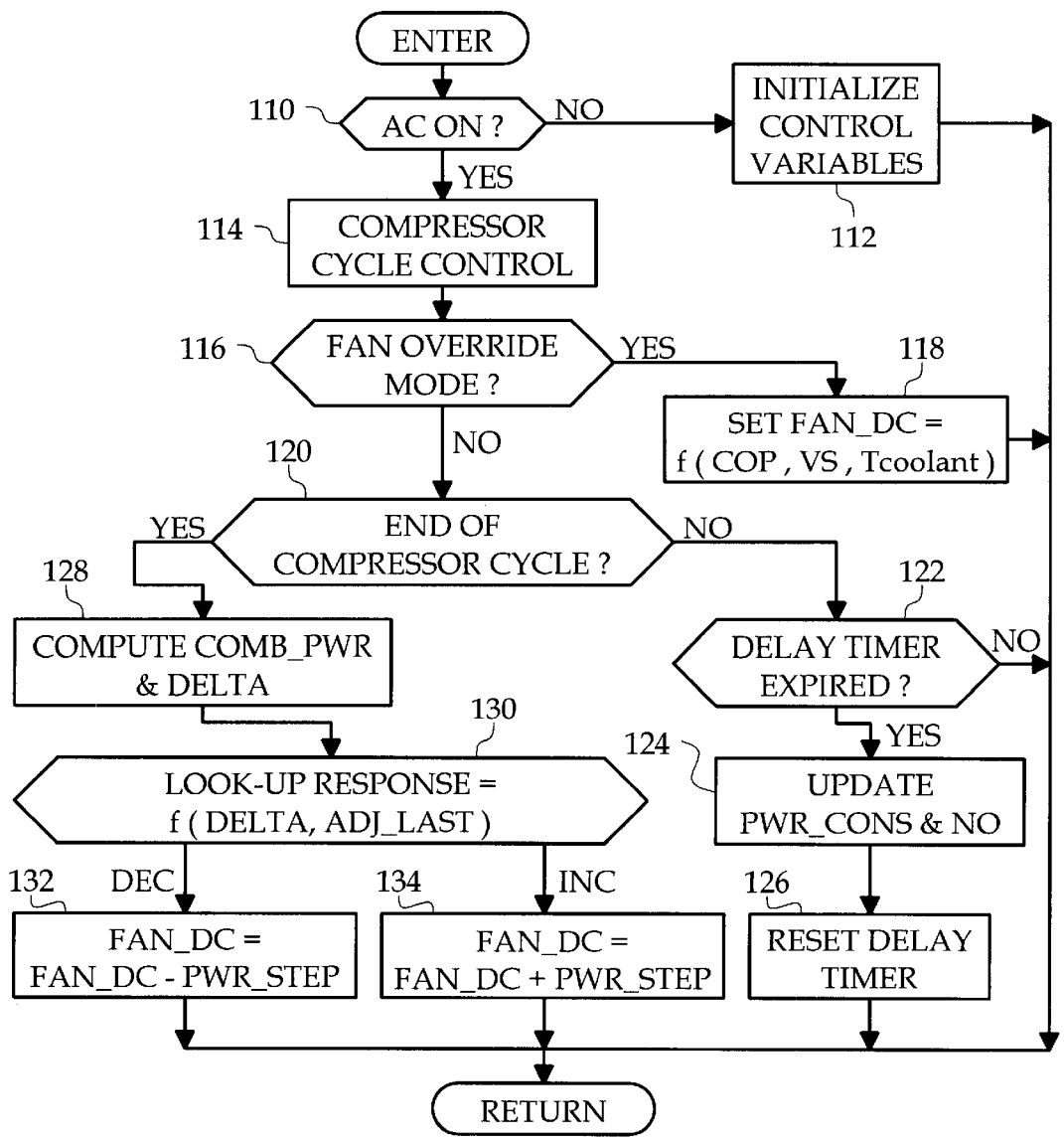
FIG. 2 is a decision matrix illustrating the action taken by the control unit of FIG. 1 according to this invention.
FIG. 3 is a flowchart illustrating a software routine executed by the control unit of FIG. 1 in carrying out the control of this invention.

Referring to the decision matrix of FIG. 2, the control objective is to adjust the cooling fan power level so as to achieve a negative rate of change in the combined power consumption of compressor 12 and cooling fan motor 34. The decision matrix sets forth the desired power adjustment (INCREASE or DECREASE) based on the last power adjustment ADJ_LAST (INCREASE or DECREASE) and the consequent rate of change in combined power consumption (DELTA), where DELTA may be defined as the power consumption during the just-completed compressor cycle less the power consumption during the previous compressor cycle, divided by the elapsed time. If the cooling fan motor power level was previously increased (that is, if ADJ_LAST=INCREASE), and the combined power consumption decreased by at least a calibration value CAL_DEC (that is, if DELTA<CAL_DEC), the control response is INCREASE, meaning that control unit 90 will incrementally increase the cooling fan motor power level. Similarly, if ADJ_LAST=DECREASE, and DELTA<CAL_DEC, the control response is DECREASE, meaning that control unit 90 will incrementally decrease the cooling fan motor power level. If the combined power consumption did not decrease by at least CAL_DEC (i.e., DELTA≧CAL_DEC), the control unit 90 incrementally adjusts the power level of the cooling fan motor 34 opposite to ADJ_LAST. That is, control unit 90 will incrementally increase the cooling fan power level if ADJ_LAST is DECREASE, and incrementally decrease the cooling fan power level if ADJ_LAST is INCREASE. In this way, control unit 90 continually seeks the cooling fan power level that will minimize the combined power consumption of compressor 10 and condenser cooling fan motor 34.

FIG. 3 depicts a flow diagram representative of software routine executed by control unit 90 for carrying out the above-described control. If the system 10 is enabled for operation (i.e., AC on), block 110 is answered in the affirmative, the block 114 is executed to carry out a control of the compressor clutch 16, and the blocks 116–126 are executed to carry out a control of the condenser cooling fan motor 34. Otherwise, the block 112 is executed to initialize the various fan control parameters used by the routine. The compressor clutch control (block 114) is typically based on a low side refrigerant parameter such as the evaporator outlet temperature EOAT, with the objective of maintaining the temperature of evaporator 28 a few degrees above the freezing point of water. The objective of the fan control, on the other hand, depends on the operating mode of the system 10. In the illustrated embodiment, steady-state operation is considered as a "normal" mode for which block 116 is answered in the negative, whereas high temperature and high AC load conditions are considered as "override" modes for which block 116 is answered in the affirmative. For example, the high temperature mode can occur when the engine coolant temperature entering the radiator (Tcoolant) is above a calibrated value; in this case, the cooling fan motor 34 may be controlled as a function of vehicle speed VS and Tcoolant. A high AC load condition can occur if the compressor outlet pressure COP is above a calibrated value; in this case, the cooling fan motor 34 may be controlled as a function of vehicle speed VS and COP. In the normal mode, the block 120 is executed to detect the end of an on/off cycle of compressor 12, which may be defined for example, as an off-to-on transition of the clutch 16. During any given compressor cycle defined in this manner, the blocks 122, 124 and 126 are executed to update the system power consumption PWR_CONS at periodic time intervals measured by a delay timer. As soon as the delay timer is expired, block 122 is answered in the affirmative, and the block 126 resets the delay timer after block 124 updates PWR_CONS, and the update number NO. The term PWR_CONS represents the cumulative power consumption of compressor 12 in the current compressor cycle; consequently, updating PWR_CONS involves increasing PWR_CONS by a current power calculation CURR_PWR based on the modeled compressor power. That is, PWR_CONS may be given as:

PWR_CONS=PWR_CONS+CURR_PWR

When the end of the current compressor cycle is detected, the blocks 128–134 are executed to adjust the cooling fan power level for the next (current) compressor cycle. The block 128 computes the combined power COMB_PWR of compressor 12 and cooling fan motor 34, and the amount (DELTA) by which COMB_PWR has decreased compared to the previous calculation of COMB_PWR (i.e., increases in COMB_PWR result in a negative value of DELTA). The term COMB_PWR is determined according to the sum of the fan power and the average compressor power over the just-completed compressor cycle. The fan power is determined as a function of the fan duty cycle FAN_DC and the energy conversion efficiency of the alternator 20, and the average compressor power is calculated according to the quotient (PWR_CONS/NO). The block 130 then determines (by table look-up, for example) the control response based on DELTA and the previous cooling fan power adjustment ADJ_LAST, as described above in reference to FIG. 2. If the control response is DECREASE (DEC), the block 132 is executed to decrement FAN_DC by a calibrated amount PWR_STEP; if the control response is INCREASE (INC), the block 134 is executed to increment FAN_DC by PWR_STEP. The initial state of ADJ_LAST on entering the normal mode is not important, as the decision matrix automatically reverses the direction of fan power adjustment unless DELTA indicates that COMB_PWR has been reduced by at least CAL_DEC. In this way, the control unit 90 continually seeks the cooling fan power level that will minimize COMB_PWR.

In summary, the control unit 90 adjusts the power level of cooling fan motor 34 to minimize the overall power consumption of the system 10 to improve engine fuel economy while maintaining adequate cooling of the condensing refrigerant. While described in reference to the illustrated embodiment, it is expected that various modifications in addition to those mentioned above will occur to those skilled in the art. For example, the control of this invention may be applied to air conditioning systems having a variable displacement compressor, other expansion devices, or utilizing a different capacity control methodology. Additionally, the compressor power could be modeled differently than described. Thus, it will be understood that control methods incorporating these and other modifications may fall within the scope of this invention, which is defined by the appended claims.

What is claimed is:

1. A method of operation for a motor vehicle air conditioning system including a refrigerant compressor and an electrically powered condenser cooling fan, comprising the steps of:
   determining a combined power consumption of the compressor and cooling fan for each of a series of operating intervals;
   determining a change in the combined power consumption from one operating interval to the next;
   incrementally adjusting a power level of the cooling fan based on a previous adjustment of the power level and the determined change in the combined power consumption so as to reduce the combined power consumption while satisfying a vehicle cooling demand; and
   overriding the adjustment of said power level during conditions of high air conditioning load or high temperature.

2. The method of operation of claim 1, wherein the power level of the cooling fan is incrementally adjusted in a direction that is the same as the previous adjustment so long as the determined change in combined power consumption indicates that at least a specified reduction in combined power consumption occurred.

3. The method of operation of claim 2, including the step of:
   incrementally increasing the power level of the cooling fan when the previous adjustment increased the power level of the cooling fan and the determined change in combined power consumption indicates that at least a specified reduction in combined power consumption occurred.

4. The method of operation of claim 2, including the step of:
   incrementally decreasing the power level of the cooling fan when the previous adjustment decreased the power level of the cooling fan and the determined change in combined power consumption indicates that at least a specified reduction in combined power consumption occurred.

5. The method of operation of claim 1, wherein the power level of the cooling fan is incrementally adjusted in a direction that is opposite to the previous adjustment if the determined change in combined power consumption indicates that at least a specified reduction in combined power consumption has not occurred.

6. The method of operation of claim 5, including the step of:
   incrementally decreasing the power level of the cooling fan when the previous adjustment increased the power level of the cooling fan and the determined change in combined power consumption indicates that at least a specified reduction in combined power consumption did not occur.

7. The method of operation of claim 5, including the step of:

incrementally increasing the power level of the cooling fan when the previous adjustment decreased the power level of the cooling fan and the determined change in combined power consumption indicates that at least a specified reduction in combined power consumption did not occur.

8. The method of operation of claim 1, wherein the compressor is cycled on and off to maintain a specified state of said air conditioning system, and said operating interval is defined by one or more cycles of said compressor.

9. The method of operation of claim 1, including the steps of:

periodically determining compressor power consumption values during said operating intervals; and determining the compressor power consumption during a given operating interval according to an average of the compressor power consumption values determined during such interval.

10. The method of operation of claim 9, wherein said power consumption values are determined according to a speed of said compressor and measures of refrigerant pressure at an inlet and an outlet of said compressor.

11. The method of operation of claim 1, wherein electrical energy for powering said cooling fan is developed by an engine-driven alternator, and the method of operation includes the step of:

determining a power consumption of said cooling fan based on a motor activation level and an energy conversion efficiency of said alternator.

* * * * *